(No Model.)  
W. H. TUCKER.  
INDEX.

4 Sheets—Sheet 1.

No. 455,807. Patented July 14, 1891.

*Fig. 1.*

KEY TO INDEX. No. 100.

| 1. | 9.  | 17. |
|----|-----|-----|
| 2. | 10. | 18. |
| 3. | 11. | 19. |
| 4. | 12. | 20. |
| 5. | 13. | 21. |
| 6. | 14. | 22. |
| 7. | 15. | 23. |
| 8. | 16. | 24. |

*Fig. 2.*

KEY TO INDEX No. 100.

| 1. Albany.      | 9. Paris.       | 17. Fixtures.     |
|-----------------|-----------------|-------------------|
| 2. Baltimore.   | 10. St Paul.    | 18. Freights.     |
| 3. Chicago.     | 11. Quebec.     | 19. Labor.        |
| 4. Detroit.     | 12. Toronto.    | 20. Machinery.    |
| 5. Havana.      | 13. Washington. | 21. Requisitions. |
| 6. London.      | 14. Orders.     | 22. Rep. of Stock.|
| 7. Manchester.  | 15. Reports.    | 23. Repairs.      |
| 8. New Orleans. | 16. Sales.      | 24. Shipments.    |

Witnesses:  
W. O. Bowen  
E. R. Brown

Inventor.  
William H. Tucker,  
By J. E. M. Bowen  
Attorney.

(No Model.)  
W. H. TUCKER.  
INDEX.  
4 Sheets—Sheet 2.

No. 455,807. Patented July 14, 1891.

*Fig. 3.*

| Key to Index. | | No. 101. |
|---|---|---|
| 1. JAN. 1st. to 15th. | 9. MAY 1st, to 15th. | 17. SEP. 1st, to 15th. |
| 2. JAN. 16th, to 31th. | 10. MAY 16th, to 31st. | 18. SEP. 16th, to 30th. |
| 3. FEB. 1st, to 15th. | 11. JUNE 1st, to 15th. | 19. OCT. 1st, to 15th. |
| 4. FEB. 16th, to 29th. | 12. JUNE 16th, to 30th. | 20. OCT. 16th to 31st. |
| 5. MAR. 1st, to 15th. | 13. JULY 1st, to 15th. | 21. NOV. 1st, to 15th |
| 6. MAR. 16th, to 31th. | 14. JULY 16th, to 31st. | 22. NOV. 16th, to 30th. |
| 7. APR. 1st, to 15th. | 15. AUG. 1st, to 15th. | 23. DEC. 1st, to 15th. |
| 8. APR. 16th, to 30th. | 16. AUG. 16th, to 31st. | 24. DEC. 16th, to 31st. |

Witnesses:  
W. E. Bowen  
E. R. Browne

Inventor:  
William H. Tucker,  
By J. E. M. Bowen  
Attorney.

(No Model.)  
4 Sheets—Sheet 3.
W. H. TUCKER.
INDEX.
No. 455,807. Patented July 14, 1891.
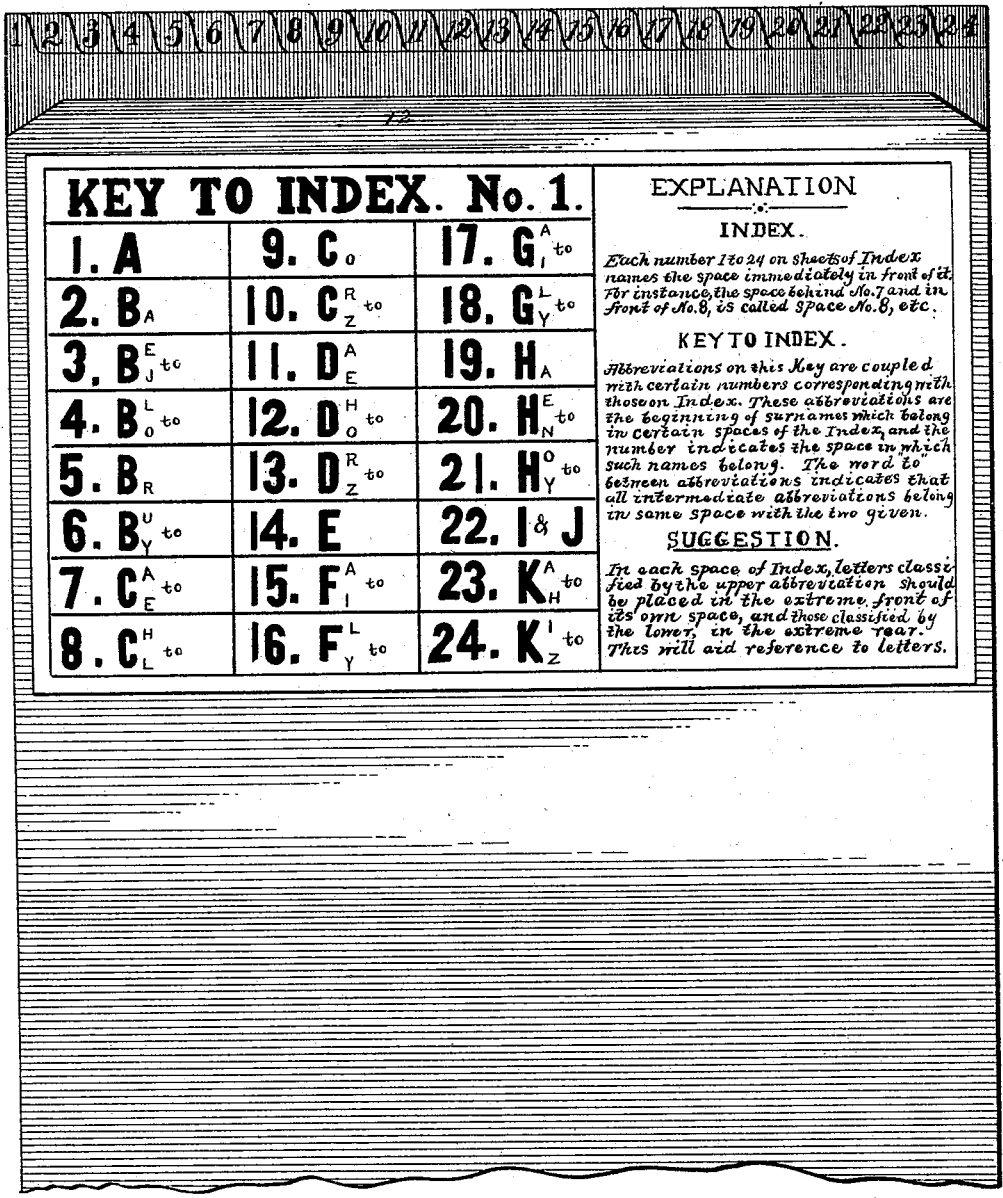

(No Model.) 4 Sheets—Sheet 4.
W. H. TUCKER.
INDEX.
No. 455,807. Patented July 14, 1891.
*Fig. 6.*
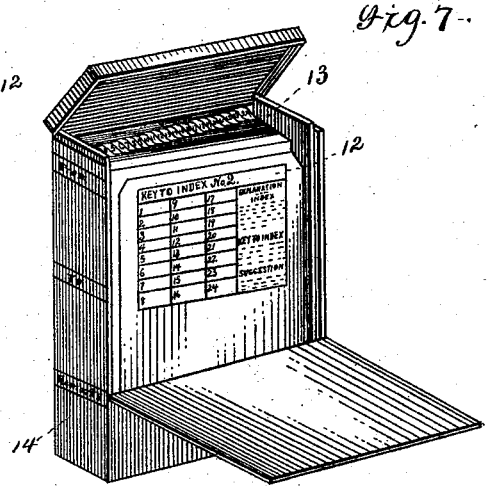
*Fig. 5.* *Fig. 7.*
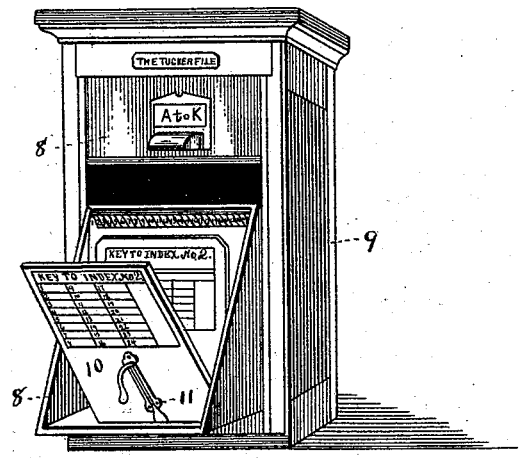
Witnesses:
W. E. Bowen
E. R. Brown
Inventor:—
William H. Tucker,
By J. E. M. Bowen
Attorney.

UNITED STATES PATENT OFFICE.

WILLIAM H. TUCKER, OF NEWARK, NEW JERSEY.

INDEX.

SPECIFICATION forming part of Letters Patent No. 455,807, dated July 14, 1891.

Application filed July 25, 1888. Renewed December 13, 1890. Serial No. 374,556. (No model.)

*To all whom it may concern:*

Be it known that I, WILLIAM H. TUCKER, a citizen of the United States, and a resident of Newark, in the county of Essex and State of New Jersey, have invented certain new and useful Improvements in Indexes, of which the following is a specification.

This invention relates to indexes adapted for use in connection with means for filing away letters and papers of various descriptions desired to be preserved in accessible condition for easy inspection.

The invention has for its object the devising of an index system which, when employed for the classification of business-letters, insurance and railroad companies' reports, and the like, will insure not only perfect accuracy in the classification of such papers, but will enable any particular paper to be inspected with the expenditure of the minimum amount of time.

The invention is hereinafter fully described in connection with the accompanying drawings, which form a part of this specification, and the features of novelty for which protection by Letters Patent is desired are specified in the claims at the end hereof.

In the drawings, in which like features are indicated by like figures of reference in the several views, Figure 1 shows an index-card, which I have designated the "key to index," and which is the foundation of my index system. Fig. 2 shows the key to index in connection with the twenty-four space-sheets hereinafter more particularly mentioned, the twenty-four spaces of the key to index being filled in with subject-titles employed in certain business houses and corporations under which letters and other documents may be classified for ready reference. Fig. 3 shows the key to index in connection with the space-sheets with the spaces of the key to index supplied with the months and divisions of dates, whereby letters and other documents may be filed away under their dates when that is desirable. Fig. 4 shows a similar arrangement of the key to index and space-sheets with the spaces of the key to index supplied with certain letters of the alphabet coupled with certain abbreviations. Fig. 5 shows the companion key to index of that shown in Fig. 4, these two views 4 and 5 illustrating the employment of my index system for the classification, under a selected division of the alphabet, of letters and documents under surnames. Fig. 6 is a view in perspective of a two-part Tucker filing-cabinet with one of the files drawn out, thereby illustrating more fully the manner of utilizing my present invention in conjunction with this style of filing mechanism; and Fig. 7 is a perspective view of a transfer-case employed as an adjunct of my index system, and more particularly referred to hereinafter.

While my index system may be employed with any style of filing-case, or even with ordinary transfer-boxes, its utility is more especially apparent when it is used in conjunction with file-cases embodying the features of construction shown in Fig. 6 of the drawings. In this file-case, which may comprise any desired number of files, the file 8, while capable of being entirely removed from its case 9, is so connected thereto that when drawn out it tilts downward and suspends from the case by engagement therewith, as shown in said Fig. 6. The file 8 is provided with a compressor 10, which is furnished with a lever 11, the compressor engaging with the file in such manner that when the lever is raised to release the compressor the latter will assume the position shown in the suspended file of Fig. 6, and does not drop beyond an inclined position, thus forming a support for the leaves or space-sheets of the index and the papers as they are tipped forward in examining the documents. When through with the file, the top of the compressor 10 is brought against the papers, which action allows the lever 11 to drop into clamping position, when by forcing the compressor in near its bottom the desired amount of pressure is exerted upon the contents of the file. The clamp is automatic and firmly holds any pressure placed upon it, and as the compressor tilts from its base a paper may be removed and replaced as easily when the file is full as when only partly filled.

In the use of file 8 it will be found to maintain its own position, so that its contents are not liable to get scattered by careless handling. It is not required to be held or carried by the operator. The papers are compressed with ease into nearly the density of new papers in original packages, thus rendering its capacity very great, and a letter or paper may be taken from or placed within the file very expeditiously and without disturbing any other letter or paper.

Unlike other indexes for papers filed flat, this index has no resistance from displacement except its own weight and the weight of its contents, so that when the lever is released the index and papers within it may be changed from file to transfer-case without any mechanical method by which the papers are perforated, mutilated, or injured.

My index system comprises, primarily, what I have denominated the "key to index" and a series of numbered division-leaves or space-sheets, and these features enter into the invention in the manner hereinafter set forth.

The key to index is indicated by 12, and is shown in Fig. 1 in skeleton condition. It comprises twenty-four spaces consecutively numbered, with the title "Key to index" at the top. The number "100" at the right of said title is an arbitrary designation by which a particular kind of index is known and by which it may be ordered when purchasing. This key to index is capable of being utilized in indexes of various descriptions adapted for use in diverse business transactions, as will be apparent from the annexed drawings and the explanation which here follows.

In practice a key to index will be secured to some convenient part of the file—as, for example, to the front of the compressor 10 when the file shown in Fig. 6 is employed—and a copy of the same will also be attached to a sheet which is intended to lie permanently in front of the series of space-sheets within the file, as is also shown in said Fig. 6.

Referring to Fig. 2, which illustrates the key to index employed in an index for the classification of letters and other documents by subjects and places, it will be seen that the space-sheets 13 number twenty-four, which number corresponds to the number of spaces on the key to index. Any convenient number other than twenty-four may be employed; but the number of space-sheets must of course agree with the number of spaces on the key to index. There are certain kinds of business, such as that conducted by railroad, steamship, and insurance companies, whose operations are extensive, in which it is very desirable, if not indispensable, to classify letters and business papers at the home or head office under the names of the places from which the letters, &c., are received, and where branch houses, agencies, and the like are located. The first thirteen spaces on the key to index of this view, Fig. 2, are devoted to names of places in illustration of this plan of classification. The remaining spaces of this view of the key to index are supplied with subject-titles, as shown. In spaces 14, 15, and 16 appear the titles "Orders," "Reports," "Sales," which titles would be employed, for instance, among others, by a large New York house having an important branch house in another city. The remaining spaces are filled with subject-titles adapted for the use of a business located, for instance, in a city, with a factory out of town. In this case the correspondence, &c., would be from one person, and hence its proper division into subjects would render it vastly more available for reference than it would be if classified with the general correspondence under an alphabetical arrangement. In all of these cases a separate file or set of files, according to the extent of the business, would be employed, and as the individual with whom the correspondence is conducted is of secondary importance, prominence is given to the place, branch house, or factory, as the case may be. In none of these cases would an abbreviation index, an A B C index, or a semi-monthly or monthly index be of any value as a means for saving labor and time in classification. Associated with this key to index there is, as before stated, the series of space-sheets 13, corresponding in number to the number of spaces on the key to index, the space-numbers of the latter being also impressed in consecutive order on the tabs of the space-sheets which occupy a position at the back of the card upon which the key to index is printed or secured.

The manner in which letters, &c., are classified under the plan described will be readily understood. Letters from "Albany," that city being in space numbered 1 of the key to index, will be placed in front of the space-sheet whose tab bears the number 1, as that number names the filling-space in front of it, whereas "Reports of stock," which title occupies space numbered 22 on the key to index will be classified in front of space-sheet numbered 22, as that number names, as before, the filing-space in front of it.

In Fig. 3 I have illustrated the manner in which my index system may be employed for the classification of letters, reports, and the like under subdivisions of the month. This particular index is designated "No. 101," as shown, and will be known and ordered by that number, said number being, as already stated, simply the arbitrary designating means by which a particular character of index may be identified without further description. This type of index will be found admirably suited for business houses and corporations having individual correspondents from whom large numbers of letters, reports, and the like are constantly being received, and which can advantageously be classified under their dates, and in the classification of which an alphabetical index would be useless. Of course in a case of this kind a file or set of files would be devoted to a single correspondent. This embodiment of the invention is utilized in the same manner as that previously described, the space-sheets which accompany the key to index having tabs upon which are impressed numbers in consecutive order corresponding to the numbers which designate the spaces of the key to index, and the documents being classified and filed away as stated in explaining the subject-title index.

In making use of my invention for the classification of letters and other documents under abbreviations of surnames, this application of the system being illustrated in Figs. 4 to 7 of the drawings, although the file-case and transfer-box of Figs. 6 and 7 are equally as applicable to the other embodiments of the invention, the twenty-four space-sheets, with their tabs provided with numbers 1 to 24, arranged in consecutive order, and the key to index, are employed as in the other described illustrations of the invention. In this embodiment of the invention the feature of numbered space-sheets coupled with the key to index, gives a wide scope in the classification, and as it relieves the mind largely and places dependence upon the eye the liability of error is reduced to a minimum in the classification of documents.

The numbers 1 to 24 on the key to index are, as in the other instances herein shown, arranged in parallel columns, and their sole office is to designate the numbers of the filing-spaces. For the purpose of illustration I have selected an index in which the alphabet is divided into two parts, the first part, Fig. 4, containing the letters from A to K, and the second part, Fig. 5, including the letters from L to Z. The index of Fig. 4 is arbitrarily designated "No. 1," and it always bears that number, which indicates invariably an index comprising the letters A to K, subdivided by fixed abbreviations which stand for the beginning of surnames. When renewing this index, it will be ordered by its designating-number. The number of index-cards employed will of course correspond to the number of divisions into which the alphabet is divided, and for each division of the alphabet a separate file will be required.

Referring to Fig. 4, it will be seen that each number 1 to 24 on the space-sheets back of the key-card names the space immediately in front of it. For instance, the space behind No. 7 and in front of No. 8 is called "Space No. 8," &c. The abbreviations on the key-card are coupled with certain numbers corresponding with those on the space-sheets of the index, these abbreviations being the beginning of surnames which belong in certain spaces of the index, which spaces are indicated by numbers on the key-card, with which the abbreviations are coupled. It will be readily understood that a letter from "Baker & Co." is filed away in front of space-sheet numbered 2 and at back of space-sheet numbered 1, while one from "Blandy & Co." belongs in space numbered 4, and also that all documents the surnames of whose writers begin with any letters from Bl to Bo, as Bl, Bm, Bn, Bo, likewise are classified in space 4. The word "to" between abbreviations on the key to index indicates that all intermediate abbreviations belong to the same space on the key-card as well as in the corresponding space between space-sheets. By a proper subdivision each letter of the alphabet may be arranged to apply to all of the twenty-four spaces of one or more files. The following, being one of thirty-five subdivisions of the alphabet, will serve to show how simple and yet how comprehensive the system is:

1. $B_{AB}^{AA}$
2. $B_{AC}$
3. $B_{AD}$
4. $B_{AF}^{AE}$
5. $B_{AH}^{AG}$
6. $B_{AI}$
7. $B_{AK}^{AJ}$
8. $B_{ALL}$
9. $B_{AM}^{AL}$
10. $B_{AO \text{ and } P}^{AN}$
11. $B_{ARB}^{ARA}$
12. $B_{ARK}^{ARC}$ to
13. $B_{ARN}^{ARL}$ to
14. $B_{ARQ}^{ARO}$ to
15. $B_{ARR}$
16. $B_{ART}^{ARS}$
17. $B_{ARV}^{ARU}$
18. $B_{ARZ}^{ARW}$ to
19. $B_{AT}^{AS}$
20. $B_{AUL}^{AUA}$ to
21. $B_{AUM}$
22. $B_{AUZ}^{AUN}$ to
23. $B_{AW}^{AV}$
24. $B_{AY \text{ and } Z}^{AX}$ The plan of designating the filing-spaces by numbers is of course applicable to an ordinary arrangement of the letters of the alphabet without any subdivision by abbreviations, and it will be seen that the extent to which the subdivisions may be carried has no limit except as circumscribed by the alphabet itself.

In Fig. 5 the key to index is designated "No. 2," which number invariably indicates an index of the character shown in that view comprising the letters L to Z, with the specified abbreviations. In making use of this type of my index system the same plan is pursued as in the other embodiments described, a key to index—No. 1, for instance—being placed on a card occupying a position in front of the space-sheets in the receptacle employed to hold them and a like card secured to the outside of said receptacle itself, in the present case to the compressor of the file. By this means the receptacle is permanently supplied with an indication of the matter it is designed to contain, and the space-sheets, with their letters classified between them, are also accompanied with like indicia. This feature is especially advantageous when transferring the contents of the files to transfer-boxes. Such a box is indicated by 14 in Fig. 7, and is shown filled with classified matter transferred from a file bearing key to index No. 2. The transfer is made by simply lifting the contents including the sheet bearing the key to index, which is never separated from the space-sheets and contents, and depositing the same in an upright position in the transfer-case, which affords the same convenient system of reference as the file itself. A new set of space-sheets, with appropriate accompanying key to index, is then placed in the file-case from which the transfer has been made, and it is thus in condition to again receive and classify the letters, &c.

Letters when classified in the manner herein stated stand head up and face front, so that the very general use by business men of printed letter-heads renders the system peculiarly advantageous to the user.

Having thus described my invention, what I claim as new, and desire to secure by Letters Patent, is—

1. In an index, a series of space-sheets or leaves having numerals which name the respective classifying-spaces, in combination with a key-card bearing like numerals arranged in conjunction with classifying-indicia, substantially as set forth.

2. In an index, a series of twenty-four space-sheets or leaves provided with tabs bearing numerals from 1 to 24, in combination with a key-card provided with numerals from 1 to 24 and arranged in conjunction with classifying-indicia, the numerals serving to indicate the spaces designated by said indicia, substantially as set forth.

3. The combination, with a series of space-sheets or leaves bearing numerals which serve to indicate the respective classifying-spaces, and a key-card with like numerals arranged thereon in conjunction with classifying-indicia, of a file-case having a duplicate of said key-card affixed to it, substantially as and for the purpose set forth.

4. The combination, with a file-case provided with a front compressor-board having secured thereon a key-card provided with a series of numerals arranged in conjunction with classifying-indicia, of a series of space-sheets or leaves numbered consecutively, and a duplicate of the said key-card, the space-sheets, and key-card arranged within the file, substantially as set forth.

5. In an index for the classification of letters and the like, a series of space-sheets provided with numbers which name the classifying-spaces, in combination with a key-card bearing the same numbers arranged in conjunction with abbreviations indicating the beginning of surnames under which the letters, &c., are to be classified, substantially as set forth.

6. In an index for the classification of letters and the like, a series of space-sheets provided with numbers which name the classifying-spaces, in combination with a key-card bearing the same numbers arranged in conjunction with the names of the months and subdivisions of the dates of the respective months, whereby letters, &c., may be conveniently classified under the dates they bear, substantially as set forth.

7. In an index for the classification of letters and the like, a series of space-sheets provided with numbers which name the classifying-spaces, in combination with a key-card bearing the same numbers arranged in conjunction with subject-titles, whereby letters, &c., may be conveniently classified according to the subject-matter upon which they bear, substantially as set forth.

8. An index for the classification of letters and the like, comprising a series of detached space-sheets provided with indicating-characters and arranged within a file in conjunction with a key-card, the said space-sheets and key-card being disconnected from one another and their proper relative positions within the file depending wholly upon their own weight, substantially as set forth.

Signed at New York, in the county of New York and State of New York, this 18th day of June, A. D. 1888.

WILLIAM H. TUCKER.

Witnesses:
J. E. M. BOWEN,
W. E. BOWEN.